United States Patent [19]

Bragard et al.

[11] Patent Number: 4,806,731
[45] Date of Patent: Feb. 21, 1989

[54] PROCESS FOR MARKING THE SURFACE OF A ROLLING MILL

[76] Inventors: Adolphe Bragard, 76, Chemin des Crêtes, B 4050 Esneux; Jacques Halleux, 29, rue Sur la Carrière, B 4546 Richelle; Frédéric Terreur, 21, rue Reine Astrid, B 4620 Fleron; Jacques Defourny, 224, rue Voie des Vaux, 4320 St-Nicolas, all of Belgium

[21] Appl. No.: 159,138

[22] Filed: Feb. 23, 1988

[30] Foreign Application Priority Data

Feb. 23, 1987 [LU] Luxembourg ............................ 86784
May 19, 1987 [BE] Belgium ............................ 08700560
Jul. 14, 1987 [BE] Belgium ............................ 08700874
Dec. 24, 1987 [BE] Belgium ............................ 08701485
Jan. 11, 1988 [BE] Belgium ............................ 08800027
Jan. 13, 1988 [BE] Belgium ............................ 08800034

[51] Int. Cl.$^4$ ............................................. B23K 26/00
[52] U.S. Cl. ........................ 219/121.69; 219/121.68; 219/121.84

[58] Field of Search ...................... 219/121.68, 121.69, 219/121.84, 121.76, 121.77, 121.8, 121.82

[56] References Cited

U.S. PATENT DOCUMENTS 4,028,523 6/1977 Anderl et al. ............... 219/121.69 X
4,322,600 3/1982 Crahay ....................... 219/121.76 X
4,377,736 3/1983 Daunt et al. ................ 219/121.69 X

FOREIGN PATENT DOCUMENTS

0257477 3/1988 European Pat. Off. ....... 219/121.84

Primary Examiner—C. L. Albritton
Attorney, Agent, or Firm—Holman & Stern

[57] ABSTRACT

A rolling mill is rotated while microscopic dents with peripheral ridges are formed by an intermittent laser beam in the presence of a gas jet directed at the beam impact zone. The output and the angle of incidence of the gas jet are controlled and microscopic dents are formed with a ridge on only part of their periphery. Steel sheet cold-rolled by means of such a roll has uniformly distributed hollows, each hollow partially surrounding an elevation.

12 Claims, 6 Drawing Sheets

PROCESS FOR MARKING THE SURFACE OF A ROLLING MILL

BACKGROUND OF THE INVENTION

1. Field of Invention

The present invention relates to a process for marking the surface of a rolling mill roll in order to provide the said roll with an isotropic and durable textured surface. The invention also extends to a roll having a surface marked by means of this process and to a sheet metal rolled with such a roll.

As is known, the texture of a roll determines, to a large extent, the texture of sheet metal rolled with the said roll.

The texture of the roll is formed by a multitude of microscopic grooves and ridges which respectively imprint elevations and grooves in the surface of the sheet metal. The regularity of the dimensions and the distribution of this texture affects, in particular, the suitability of these sheet metals for stamping and coating.

2. Description of the Prior Art

From the Pat. No. BE-A-870 600 in particular, a process is already known for creating a multitude of microscopic dents or microcraters in the surface of a rolling mill roll by means of an intermittent laser beam. These microscopic dents are surrounded by a projecting rim or ridge having a high hardness value. A sheet metal rolled with such a roll therefore has, on its surface, a multitude of grooves imprinted by the ridges of the roll and elevations corresponding to the microscopic dents.

In this process, the roll is set in rotation about its longitudinal axis and its surface is struck by a series of laser impulses produced by chopping a continuous laser beam by means of a pierced disk. The laser beam moves along the roll in such a manner that its impact zone describes a helicoidal trajectory on the roll surface.

The device for forming such a microscopic dent is now well-known. It should be recalled that in its impact zone on the roll surface, each laser impulse causes a certain volume of metal to be heated and, within this volume, a droplet of the metal of the roll is melted. The volume of heated metal, as well as the volume of molten metal, depend on the strength and duration of the laser impulse. The action of the laser impulse is generally reinforced by a jet of oxidising gas directed at the said impact zone. The sudden local increase in temperature causes the formation of a plasma above the impact zone due to combustion of the metal. This plasma exerts a pressure on the molten metal which, combined with the mechanical effect of the gas jet, pushes back the molten metal radially towards the edge of the heated zone. The molten metal thus pushed back, in some cases even beyond the heated zone, forms a ridge which solidifies very quickly. The cavity hollowed out by the pushing back of the molten metal forms the microscopic dents.

The ridges and microscopic dents collectively determine the texture of the roll surface and hence the texture of the sheet metal to be rolled with the roll. The service life of the ridges therefore affects not only the service life of the roll and the evenness of texture of the sheet metals produced, but also, as a result thereof, the evenness of the properties of these sheet metals, in particular with respect to their suitability for painting and resistance to jamming.

The service life of the ridges depends, to a large extent, on their adhesion to the roll surface. This adhesion is in turn the result of a welding operation: if the droplet of molten metal is pushed back too far beyond the area heated by the laser impulse, the ridge formed will not adhere correctly to the roll surface, the temperature of which is locally too low. This will cause a crack at the interface between the roll surface and the ridge, leading to a rapid pulling-off of the ridge due to the force of the rolling process. The quality of the laminated sheet metals then deteriorates and it is necessary to interrupt the rolling process to redress the roll. The productivity of the rolling mill may thereby be seriously affected.

Furthermore, the process according to the cited No. BE-A-870 609 ensures the formation of joining microscopic dents, such that their ridges form, in the roll surface, a network of ridges surrounding a multitude of individual depressions. Consequently, a sheet metal rolled with such a roll will have, on its surface, a network of communicating grooves surrounding individual, regularly-distributed elevations.

This network of grooves generally assures a good circulation, and hence an homogeneous distribution, of the lubricant used, for example, for a stamping operation of the sheet metal. It has been shown, however, that if the pressure of the equipment becomes too strong, the lubricant is forced back into the network of grooves and forms direct contacts between the metal of the equipment and the metal of the surface elevations of the sheet metal. The latter are then exposed to abrasion and pulling-off, involving a risk of degradation of the surface of the sheet metal. Furthermore, the lack of lubricant increases the risk of jamming in the case of stamping.

SUMMARY OF THE INVENTION

The present invention proposes a process for marking the surface of a rolling mill roll whereby it is possible to overcome these disadvantages by forming microscopic dents which not only have an improved adhesion, and hence a longer service life, but also provide a configuration of the sheet metal surface which is more favorable to lubrication in the case of stamping.

According to the present invention, a process for marking the surface of a rolling mill roll, whereby the said roll is rotated about its longitudinal axis and its surface is imprinted with a multitude of microscopic dents or microcraters by means of an intermittent laser beam and in the presence of a gas jet directed at the impact zone of the said laser beam, each microscopic dent or microcrater giving rise to a rim or ridge, is characterised in that the output and angle of incidence of the said gas jet is controlled and in that microscopic dents are formed being provided with a ridge on only a part of their periphery.

According to a first embodiment of the process according to the invention, a gas jet is used comprising a non-oxidising, preferably reducing gas.

A non-oxidising gas is to be understood here to mean a non-oxidising gas on its own or a mixture of a plurality of non-oxidising gases such as carbon dioxide, helium, argon or nitrogen.

In the same way, a reducing gas is to be understood in this case to mean either a pure reducing gas, such as hydrogen, ammonia, carbon monoxide, hydrogen sulphide, or a mixture of a plurality of reducing gases and of one or more neutral gases such as nitrogen, argon, helium or their mixtures.

It was shown that the use of a non-oxidising, or reducing, gas caused a less sharp increase in temperature of the metal than oxygen; the metal droplet still melts, but is more viscous. In these conditions, the molten metal forms a ridge which is much less extensive than in the case of oxygen; it is also projected less far out of the microscopic dent and moreover remains in the area of the surface heated by the laser beam.

Moreover, such a gas does not cause the molten metal droplet to oxidise; there is therefore no oxide layer between the ridge and the roll and the adhesion of the ridge is not compromised.

In particular, it is advantageous to use a mixture of gases, comprising nitrogen and 3% to 8% by volume of hydrogen, the hydrogen content preferably being 5% by volume.

With such a content of about 5% by volume of hydrogen, it is possible to operate in free air, since this amount of hydrogen does not lead to the risk of explosion in the presence of oxygen.

However, it would not be beyond the scope of the invention to use a higher hydrogen content; in this case it would simply be necessary to take special precautions, such as operating in an air-tight enclosure, for example.

According to another embodiment of the process according to the invention, the alignment of the gas jet is chosen in relation to the desired position of the partial ridge at the periphery of the microscopic dent. This position may be reached by also adjusting as appropriate the alignment of the output and the angle of incidence of the gas jet.

Within the scope of this embodiment, the partial ridge may occupy any position on the periphery of the microscopic dent. The isotropy of the texture will be ensured provided that the partial ridge occupies the same position for all the microscopic dents.

However, it has proven particularly advantageous to align the gas jet according to a direction substantially perpendicular to the generatrix of the said roll passing over the said impact zone.

Substantially perpendicular is to be understood to mean that the direction of the gas jet forms an angle of 10° maximum with the perpendicular to the generatrix in question of the roll.

According to a preferred embodiment, the said gas is injected in the direction of rotation of the roll.

By injecting the gas in the said substantially perpendicular direction, it is possible to form a partial ridge which is compact and adhesive.

According to a further embodiment of the process according to the invention, the ratio L/D between the dimension L of the microscopic dents, measured along the periphery of the roll, and their dimension D, measured parallel to the longitudinal axis of the roll, has a value greater than 1.

The applicants have discovered in the course of their experiments that the adhesion of the ridges can vary to a considerably degree according to the shape of the microscopic dents. It has been shown in this respect that microscopic dents elongated along the roll periphery led to particularly advantageous results.

The elongation of the microscopic dents in the desired direction is expressed here by the factor of shape formed by the ratio L/D. It should be clarified in this case that the dimensions L and D are measured on the volume of metal melted by a laser impulse; this volume is greater than that of the cavity remaining after the solidification of the ridge. For the sake of simplification, the dimensions L and D will hereafter be referred to as the length and width respectively of the microscopic dents.

According to a particular feature of the process according to the invention, the ratio L/D is given a value of less than 5.

Still according to the invention, the ratio L/D is preferably between 1.1 and 2.5.

The adhesion of the ridge, expressed by the effort needed to pull the ridge off, increases perceptibly whenever the ratio L/D is greater than 1; this increase becomes genuinely advantageous in practice when the ratio L/D reaches and exceeds 1.1. This increase cannot be continued indefinitely, however; as soon as the ratio L/D becomes greater than 2.5, the ridge becomes the site of deformations which become unacjceptable when the ratio L/D reaches 5.

The elongation of a microscopic dent in the desired direction may be effected in different ways which generally have the effect of lengthening the period of action of the laser impulse on the roll surface in relation to the length of the impulse leading to circular dents.

In the type of process according to the invention, the roll to be marked is set in rotation at a constant speed about its longitudinal axis, while the intermittent laser beam is obtained by chopping a continuous laser beam by means of a pierced rotating disk. In current technology, the circumferential width of the apertures made in the disk, as well as the speeds of rotation of the roll and of the chopping disk, are adapted one to the other so as to form microscopic dents which are as circular as possible.

To effect the specified elongation of the microscopic dents according to the present invention, in particular the speed of rotation of the chopping disk can be reduced or the circumferential width of the apertures of the chopping disk can be increased whilst keeping the speed of rotation of the roll unchanged. It would also be possible to increase the speed of rotation of the roll without changing the speed of rotation or the geometric characteristics of the chopping disk. It is also possible to combine a plurality of the above-mentioned modifications.

It is particularly easy to change the speed of rotation of the chopping disk. However, this has the result that the distance between two consecutive microscopic dents also increases, leading to a decreased distribution density of microscopic dents along the periphery of the roll. Such a modification may, in some cases, have a disadvantageous effect on the texture of the roll as well as on the texture of the sheet metal rolled with the said roll.

By widening the apertures of the chopping disk, it is possible to assure the elongation of the microscopic dents without decreasing their distribution density. This operation brings the microscopic dents closer together, i.e. reduces the distance between two consecutive microscopic dents, without changing the distance separating the start of two consecutive microscopic dents.

According to a further feature of the process according to the invention, the said ridge is heated, together with the portion of the roll surface on which the said ridge is disposed, to a temperature sufficient to cause the start of melting and welding of the ridge to the said portion of the roll surface.

According to the invention, this heating is carried out by means of a second laser beam, which is preferably obtained by deviating at least one part of the said intermittent laser beam.

According to another feature, the present invention also relates to a rolling mill roll having an improved texture obtained by the process just described.

The rolling mill roll which is also the subject of the present invention, with a surface having a multitude of microscopic dents formed by means of an intermittent laser beam is characterised in that the microscopic dents are provided with a ridge on only one part of their periphery.

According to the invention, the said ridge extends at most over half of the periphery of the corresponding microscopic dent.

Also according to the invention, at least 30% of the metal forming the said ridge is located inside the microscopic dent with which the said ridge is associated.

Still according to the invention, substantially all the metal forming the said ridge is located inside the area of the roll heated by the laser impulse which gave rise to the corresponding microscopic dent.

According to a particular feature of the roll according to the invention, the ridge has a width which does not exceed approximately 100 micrometers and a height which does not exceed 30 micrometers, these being measured from the initial surface of the roll.

According to another particular feature of the roll according to the invention, the microscopic dents formed in its surface have a ratio L/D of between 1 and 5, and preferably between 1.1 and 2.5.

Yet a further feature of the present invention relates to a sheet of steel rolled with such a roll and having a surface having a multitude of uniformly-distributed hollows, each of which partially surrounds an elevation.

Advantageously, the said hollows have a width not exceeding approximately 100 micrometers and a depth not exceeding approximately 30 micrometers.

The present invention may be better understood with the aid of a description of various preferred embodiments given here by way of examples and with reference to the attached drawings, in which

BRIEF DESCRIPTION OF DRAWINGS

All these figures are obviously diagrammatic representations in which the elements not directly necessary to the understanding of the invention have not been included. Furthermore, identical or similar elements are indicated by the same reference numerals in all figures.

DESCRIPTION OF PREFERRED EMBODIMENTS

Figures 1, 1A:
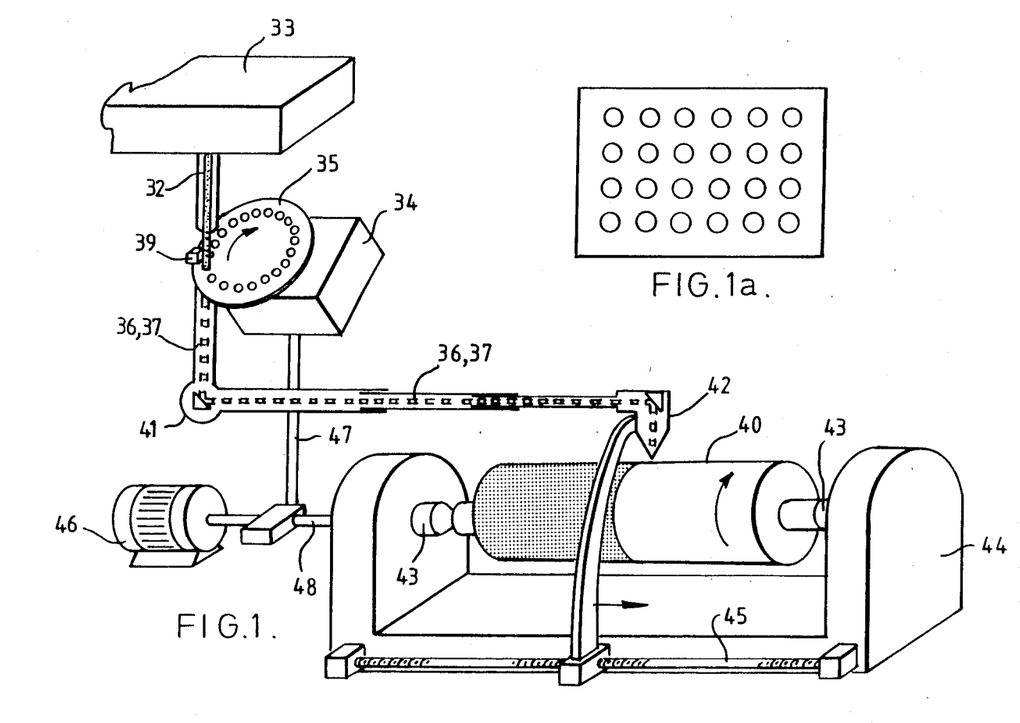
FIG. 1 shows the known principle of marking the surface of a rolling mill roll by means of an intermittent laser beam.
FIG. 1a shows the texture on the rolling mill in an enlarged view of substantially circular microscopic dents.

FIG. 1 is a diagrammatic representation of a device of the prior art intended to recall the principle of the process of marking a rolling mill roll by means of an intermittent laser beam.

A continuous laser beam 32, originating from an appropriate emitter 33, is made intermittent by chopping by means of a pierced disk 35. The intermittent laser beam 36, 37 is transmitted to a marking head 42 which deviates it towards the surface of a rolling mill roll 40 mounted between the points 43. The marking head 42 is driven in translation along the roll 40 by means of a mother screw 45. The chopping disk 35, the roll 40 and the mother screw 45 are rotatably driven by a motor 46 via distribution mechanisms ensuring the desired synchronisation of the different movements.

In a conventional chopping disk such as 35, the width of the apertures is equal to the distance separating two adjacent apertures. Thus a texture is obtained formed of substantially circular microscopic dents arranged in a regular fashion, as shown in FIG. 1a, which is an enlarged view of a field of the roll surface 40 after conventional marking.

Figure 2:
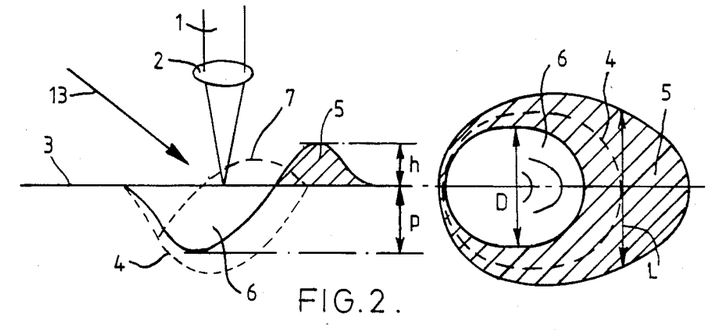
FIG. 2 shows, in profile and in plan, a microscopic dent and a ridge obtained by an oxygen jet according to the prior art.

FIG. 2 is a diagrammatic representation of a microscopic dent and a ridge formed by an intermittent laser beam in the presence of an oxygen jet, according to the prior art. The intermittent laser beam 1, focussed by a lens 2, strikes the surface 3 of the rolling mill roll and causes the melting of a droplet of metal, as defined by the broken line 4; beyond the surface indicated by the broken line 4, the metal is heated to a certain depth without reaching melting point. Under the effect of the oxygen jet in particular, the molten metal 4 is partly expelled from its housing and forms an asymmetrical ridge 5 surrounding the microscopic dent 6. The line 7 indicates an intermediate position of the metal droplet during its expulsion movement.

Figure 3:
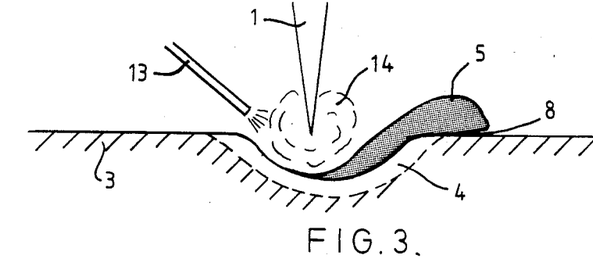
FIG. 3 shows the position of a ridge obtained by the prior art.

As is shown in more detail in FIG. 3, the surface 3 of a rolling mill roll turning about its axis in the direction of the arrow is struck by an intermittent laser beam 1. The action of the laser impulse reinforced by an oxygen jet 13 brings about the melting of a droplet of metal and the formation of a very localised plasma 14. The pressure of the plasma 14 and the oxygen jet 13 push back the molten metal into a ridge 5 which spreads in part beyond the heated zone, without melting, via the laser impulse. The ridge does not adhere properly to this cooler zone and forms a crack 8, favouring the pulling-off of the ridge during subsequent rolling.

Figure 4:
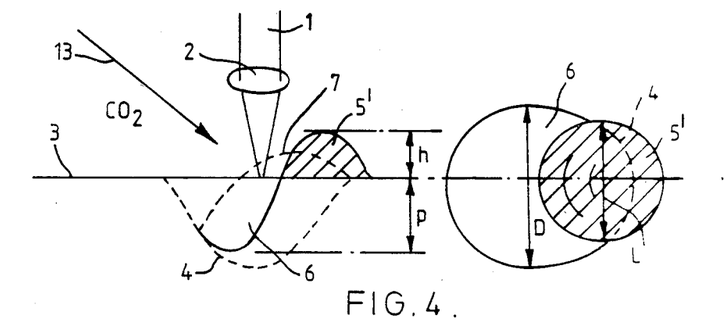
FIG. 4 shows, also in profile and in plan, a microscopic dent and a ridge obtained by a carbon dioxide ($CO_2$) jet according to an embodiment of the present invention.

FIG. 4 illustrates a situation similar to that of FIG. 2 whereby the oxygen jet has been replaced by a carbon dioxide jet, all other conditions of functioning being unchanged. It can be seen that, in this case, the molten metal droplet formes a ridge 5' which remains in the form of a more abrupt and much more extensive pastille than in FIG. 2. For the most part, it remains above the molten zone 4, where 4 has the maximum adhesion.

Figure 5:
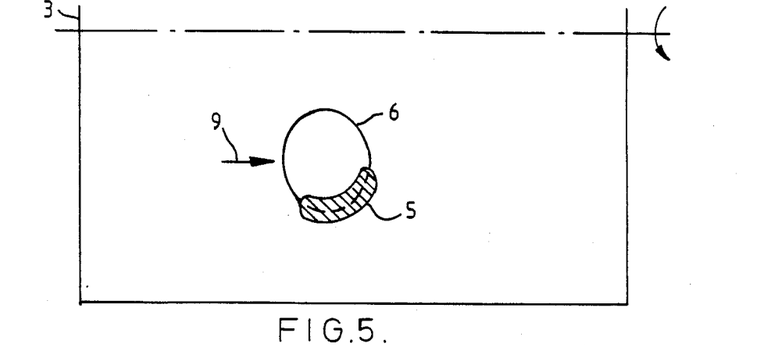
FIG. 5 shows the form and position of a ridge under the effect of a longitudinal injection of the gas.
Figure 6:
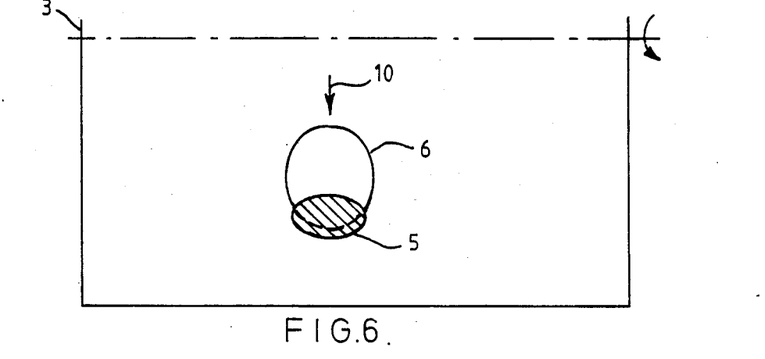
FIG. 6 shows the form and position of a ridge under the effect of a transverse injection of the gas, according to another embodiment of the present invention.

FIGS. 5 and 6 show the form and position of the ridge with respect to the microscopic dent for the two alignments 9 and 10 respectively of the gas jet. The size of the microscopic dents and ridges is very exaggerated here in order to show clearly the difference between the two situations.

FIG. 5 shows that the ridge is quite extensive and that it clearly overflows the microscopic dent 6; moreover, it is carried towards one side of the microscopic dent.

FIG. 6 shows that, by virtue of a gas jet 10 aligned according to the present invention, the ridge 5 remains symmetrical with respect to the microscopic dent 6. Furthermore, the ridge 5 is in this case more compact and is solidly welded to the roll surface since it barely extends beyond the microscopic dent.

Figure 7:
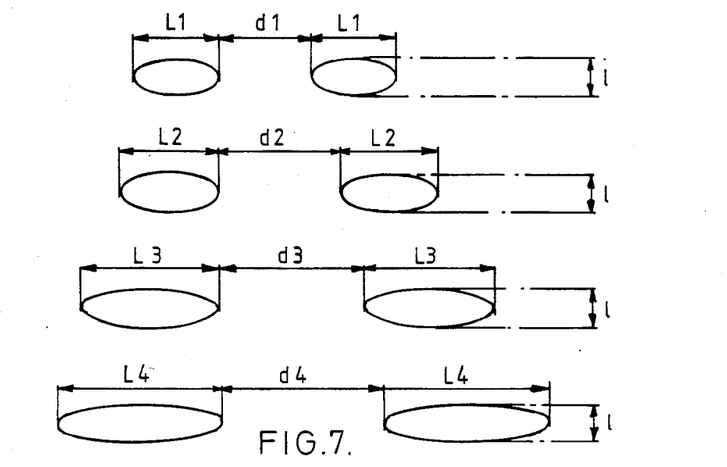
FIG. 7 shows the arrangement of microscopic dents resulting from a decrease in the speed of rotation of the chopping disk.

FIG. 7 shows the arrangement of two consecutive microscopic dents in the circumferential direction of the roll, for four different speeds of rotation of the chopping disk 35 (FIG. 1). These speeds, labelled $V_1$, $V_2$, $V_3$ and $V_4$ were respectively 2500, 2200, 1900 and 1600 rev/min. They cause not only an increasing elongation of the microscopic dents, but also an increasing distance therebetween.

Figure 8:
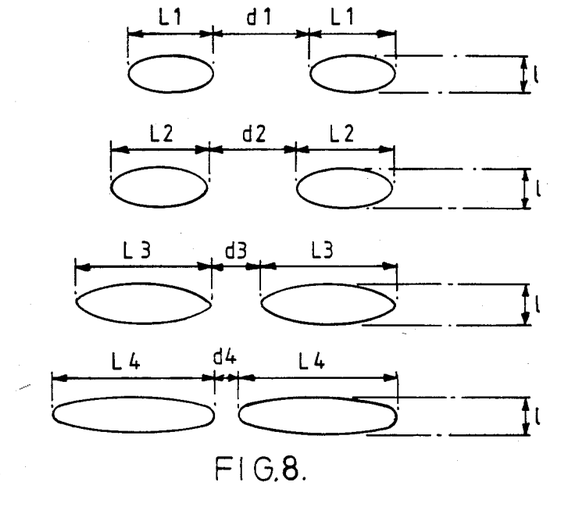
FIG. 8 shows the arrangement of microscopic dents resulting from a widening of the apertures of the chopping disk.

FIG. 8 illustrates the effect of widening the apertures of the chopping disk. In the present case, this widening is obtained by decreasing the distance between two adjacent apertures, whereby it is possible not to change the number of apertures.

Figure 9:
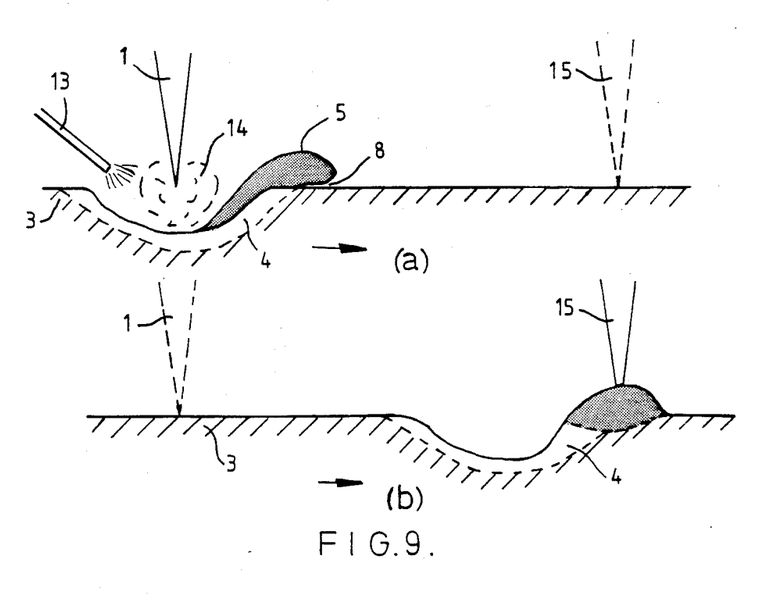
FIG. 9 shows the re-melting operation by means of a second laser beam.

FIG. 9 illustrates, in two views (a) and (b), the process according to the invention for improving the adhesion of the ridge.

The illustration in FIG. 9a is identical to that of FIG. 3 with the difference that it comprises a second intermittent laser beam 15. The latter is shown here by a broken line because it is itself interrupted during the impulse of the first laser beam 1.

The rotational movement of the roll 3 being permanent, the ridge 5 arrives at the right of the second laser beam 15. At that moment, the first laser beam 1 is interrupted while the second laser beam 15 emits an impulse which heats the ridge 5 and the portion of the surface on which it rests. This heating causes the start of melting and the welding of the ridge 5 to the roll surface 3, suppressing the crack 8. This situation is illustrated in FIG. 9b.

The ridge thus acquires an adhesion which, combined with increased hardness, assures a long service life of the rolling mill roll.

Figure 10:
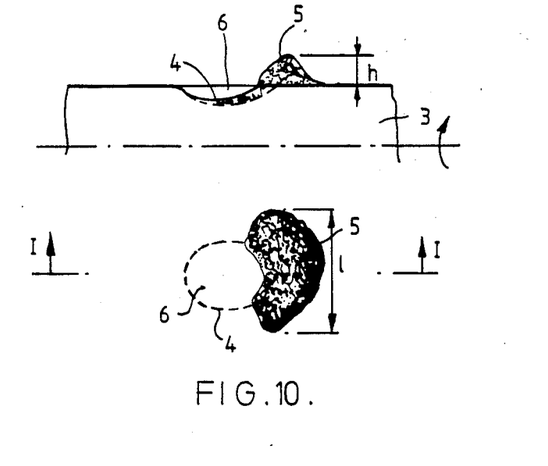
FIG. 10 shows, in plan and in section, a microscopic dent and a ridge formed in the surface of a roll according to the invention.

FIG. 10 is a diagrammatic representation of a microscopic dent 6 and a ridge 5 formed on the surface 3 of a rolling mill rolls according to the invention, by an intermittent laser beam controlled in a suitable manner. The roll is represented by an axis of rotation about which it rotates. Its surface is struck by an intermittent laser beam, each impulse of which brings about the formation of a microscopic dent by means of a known mechanism. It should be noted simply that at its point of impact, each impulse causes a certain volume of metal to be heated and, inside the latter, a droplet of metal 4 is melted. This molten metal is thrown back radially towards the edge of the heated zone, or possibly beyond this zone, where it forms a ridge which solidifies very rapidly.

In the present case, the operating conditions are controlled in such a manner that most of the molten metal is thrown back on one side only. Thus a ridge 5 is obtained which partly surrounds a microscopic dent 6. In FIG. 10, the broken line 4 defines the molten zone 4. It can be seen that the molten metal is thrown back partly beyond the molten zone 4. The conditions are such that the molten metal adheres very well to the hot surface and that there is no crack between the base of the ridge 5 and the roll surface. Consequently, the ridge is not likely to be pulled off during the rolling of a sheet of metal. For a laser beam having a strength of approximately 1.5 kW, the oxygen output is controlled such that the ridge extends at most over a third of the periphery of the microscopic dent, the width w of the ridge being less than 100 micrometers and its height h being at the most equal to 30 micrometers. To reinforce the adhesion of the ridge, 30% of the metal forming the said ridge must be located inside the microscopic dent. In view of the fact that this same operation is repeated on each microscopic dent, the ridges will not be joined together. The roll surface thus has a multitude of elevations 5 separated by a network of grooves, the bottom of which is substantially formed by the totality of the depressions 6.

Figure 11:
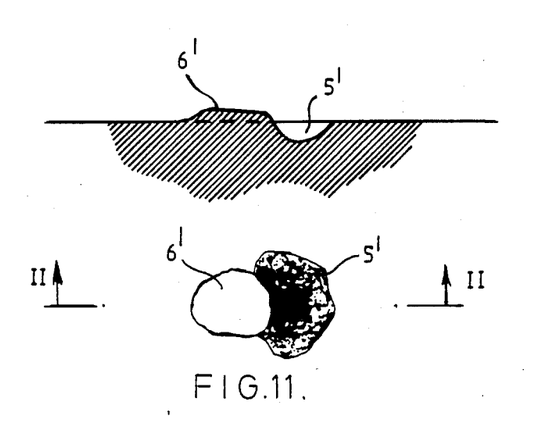
FIG. 11 shows also in plan and in section, the motif imprinted in the surface of a sheet of steel by the microscopic dent and the ridge of FIG. 10.

In the rolling process, such a microscopic dent imprints in the surface of a sheet metal the relief diagrammatically represented in FIG. 11; the hollow 5' corresponds to the ridge 5 and the elevation 6' corresponds to the depression 6. The sheet metal thus produced has a multitude of separate hollows 5' regularly distributed over the surface of the sheet metal. The dimensions of these hollows substantially correspond to those of the ridges which formed them.

In the case of stamping such a sheet metal, the lubricant remains trapped in these hollows, from which it cannot normally escape. If the pressure of the tool on the sheet metal is too high, the sheet metal is elongated and the lubricant is partially expelled from the hollows in the affected area; it thus forms a lubricant film in the critical position. If, on the other hand, the pressure of the tool on the sheet metal is normal, the sheet metal slides, taking the lubricant with it; the latter is therefore not scraped away by the tool and may act in a more critical problem area later on.

The hollows made in the sheet metal according to the invention may be very small and very close together, and yet remain separate. The relief of the sheet metal surface thus becomes not very pronounced, which contributes to an improved appearance of the sheet metal after painting.

The following examples clearly illustrate the advantages associated with the different embodiments of the process according to the invention which has just been described in detail.

Example 1: effect of the nature of gas injected

The surface of a rolling mill roll was treated by means of an intermittent laser beam of a strength of 1300 V in the presence of a gas output of 9 l/min.

One part was treated using an oxygen jet and another part using a $CO_2$ jet, all other conditions being unchanged.

Table 1 below shows that, for a practically identical microscopic dent, the corresponding ridge with the $CO_2$ jet is more compact and more prominent than the one obtained with an oxygen jet.

TABLE 1

| GAS | h | w | d | D |
|---|---|---|---|---|
| $O_2$ | 34.3 | 159.4 | 43.2 | 155.5 |
| $CO_2$ | 45.8 | 143.0 | 44.7 | 153.6 |

All dimensions are expressed in micrometers (μm). The signs used in this table have the following meaning:

h: height of the ridge
w: width of the ridge at its highest point
d: depth of the microscopic dent
D: width of the microscopic dent at its deepest point.

The corresponding dimensions are identified in FIGS. 2 and 4.

Example 2: Effect of the alignment of the gas jet

To illustrate the effect of the alignment of the gas jet, comparative tests were carried out.

In a first test, an 800 W laser beam and a gas output of 6 l/min were used. In a second test, a 900 W laser beam and a gas output of 12 l/min were used. For each test, the gas jet was aligned successively according to the positions 9 and 10 shown in FIGS. 5 and 6 respectively; none of the other operating conditions was altered.

In all cases, the height (h) and the width (w) of the ridge at its highest point, the depth (d) and the width (D) of the microscopic dent at its deepest point, the arithmetic roughness (Ar) of the roll surface, and the pulling-off force (F) of the ridges were measured. The results are collected in Table 2, in which the dimensions and roughness are expressed in micrometers, whereas the pulling-off force is expressed in newtons.

TABLE 2

| Test no. | gas jet | gas (l/min) | power (W) | h (μm) | w (μm) | d (μm) | D (μm) | Ar (μm) | F (N) |
|---|---|---|---|---|---|---|---|---|---|
| 1 | 9 | 6 | 800 | 15 | 106 | 18 | 96 | 3.5 | 1.0 |
|   | 10 | 6 | 800 | 28 | 109 | 37 | 113 | 3.6 | 1.7 |
| 2 | 9 | 12 | 900 | 24 | 121 | 25 | 141 | 5.5 | 1.2 |
|   | 10 | 12 | 900 | 45 | 132 | 31 | 123 | 4.9 | 1.9 |

The two tests clearly show that the change from alignment 9 to alignment 10 causes a sharp increase both in the height (h) of the ridge and in the depth (d) of the microscopic dent; the widths w and D do not alter very markedly. The ridge corresponding to the alignment 10 had the shape illustrated in FIG. 6; it was more compact and more prominent than the one in FIG. 5.

It will also be seen that the pulling-off force F, i.e. the adhesion of the ridge, increased from 60 to 70% when the alignment of the gas jet was changed. This force was determined by the method disclosed in the patent application No. BE-A-08700372.

Example 3: Effect of the ratio L/D of the microscopic dents (a) effect of the speed of rotation of the chopping disk This effect is illustrated in FIG. 7, which shows the arrangement of two consecutive microscopic dents in the circumferential direction of the roll for four different speeds of rotation of the chopping disk.

It is seen that the decrease in this speed of rotation causes not only an elongation of the microscopic dents, but also an increasing distance therebetween. The distribution density of the microscopic dents along the periphery, $K_L$, expressed as the number of microscopic dents per inch, decreased substantially. The width of the microscopic dents is, in all cases, 120 μm. Table 3 below gives the values of the length (L), the distance (d), the density ($K_L$), and the ratio (L/D) of the microscopic dents formed at the above-mentioned different speeds.

TABLE 3

| Test no. | V rev/min | L μm | L/D | d μm | Kl nb |
|---|---|---|---|---|---|
| 1 | 2500 | 170 | 1.42 | 113 | 90 |
| 2 | 2200 | 190 | 1.58 | 126 | 80 |
| 3 | 1900 | 220 | 1.83 | 145 | 70 |
| 4 | 1600 | 250 | 2.08 | 169 | 60 |

(b) effect of the distance between the apertures of the chopping disk

This effect is illustrated in FIG. 8.

Table 4 below indicates the effect of varying the distance e between two adjacent apertures on the length L and the ratio L/D of the microscopic dents. The width D was also 120 μm in all cases.

TABLE 4

| Test no. | e mm | L μm | d μm | L/D |
|---|---|---|---|---|
| 1 | 1.33 | 170 | 113 | 1.42 |
| 2 | 1.10 | 190 | 93 | 1.58 |
| 3 | 0.86 | 210 | 73 | 1.75 |
| 4 | 0.63 | 230 | 53 | 1.92 |

It was discovered that the decrease in the distance e causes the microscopic dents to move closer together, compensating for their elongation making it possible to retain a constant density of microscopic dents ($K_L$), equal to 90 in the present case. This constant density of microscopic dents is advantageous for the regularity of the texture of the roll.

(c) effect of the ratio L/D on the adhesion of the ridges

To illustrate the effect of the elongated form of the microscopic dents on the adhesion of the ridges, various operations for marking the roll by means of a laser of a strength of 800 V and in the presence of an oxygen jet having an output of 12 l/min were carried out. To effect the elongation of the microscopic dents, the speed of rotation of the chopping disk was altered, which led to a variation of the density $K_L$ of the microscopic dents in the longitudinal direction thereof. On the other hand, the density $K_d$ in the transverse direction, i.e. parallel to the longitudinal axis of the roll, remained constant.

In addition to the length L of the microscopic dents as defined above, the height h and the width w of the ridges, as well as the depth d and the width D of the dents after formation of the ridges, were measured.

Finally, the roughness Ar and the adhesion of the ridges were measured. For the last-mentioned measurement, the method described in the patent application No. BE-A-08700372 was used. The results obtained are collected in Table 5 below.

TABLE 5

| Test No. | Ka | Kl | L μm | h μm | l μm | d μm | D μm | Ar μm | L/D | F N |
|---|---|---|---|---|---|---|---|---|---|---|
| a | 90 | 110 | 120 | 29 | 132 | 22 | 115 | 2.6 | 1.04 | 2.0 |
| b | 90 | 90 | 170 | 28 | 121 | 23 | 120 | 2.4 | 1.42 | 2.3 |

TABLE 5-continued

| Test No. | Ka | Kl | L μm | h μm | l μm | d μm | D μm | Ar μm | L/D | F N |
|---|---|---|---|---|---|---|---|---|---|---|
| c | 90 | 50 | 270 | 31 | 137 | 21 | 116 | 2.2 | 2.33 | 2.6 |

These results show that, both the dimensions of the ridges and those of the dents are subject to virtually no variation. The roughness Ra decreases when the speed of rotation of the chopping disk decreases because the density of microscopic dents ($K_L$) decreases; this variation in the roughness has no effect, however, on the adhesion of the ridges.

The increase in length L of the microscopic dents causes an increase in the ratio L/D, which is accompanied by a substantial increase in the pulling-off force F in newtons, i.e. in the adhesion of the ridges.

Since the ridges are virtually unchanged, the improved adhesion is due to the fact that the ridges are formed on the heated zone of the roll surface; this effect is more marked the more elongated the microscopic dent.

The microscopic dents cannot, however, be elongated indefinitely because, when the ratio L/D reaches about 5, a part of the molten metal of the ridge flows back and partially fills the microscopic dent. The resulting ridge is deformed in an irregular manner.

Obviously the present invention is not strictly limited to the embodiments which have just been described and illustrated by way of example. Various modifications may be made to the invention, in particular to the manner of effecting the elongation of the microscopic dents or of heating the ridge. Finally, the various features and embodiments described above may be implemented separately or in any possible combination without going beyond the scope of the invention as defined by the following claims.

We claim:

1. A process for marking the surface of a rolling mill roll having a longitudinal axis, comprising the steps of rotating the roll about its longitudinal axis and forming a multitude of microscopic dents are formed in the surface of the said roll by means of an intermittent laser beam in the presence of a gas jet directed at an impact zone of the said laser beam, each microscopic dent giving rise to a ridge, and controlling the output and the angle of incidence of the gas jet, whereby microscopic dents are formed with a ridge on only a part of their periphery.

2. A process according to claim 1, wherein a gas jet comprises a non-oxidising gas.

3. A process according to claim 2, wherein the non-oxidising gas is a reducing gas.

4. A process according to claim 1, including aligning the said gas jet in a direction substantially perpendicular to the generatrix of the roll passing over the said impact zone.

5. A process according to claim 4, including injecting the said gas in the direction of rotation of the roll.

6. A process according to claim 1, wherein the ratio L/D between the dimension L of the microscopic dents, measured along the periphery of the roll, and their dimension D, measured parallel to the longitudinal axis of the roll, is between 1 and 5.

7. A process according to claim 6, wherein the ratio L/D is between 1.1 and 2.5.

8. A process according to claim 1, including heating the ridge together with the portion of the roll surface on which the ridge is disposed, to a temperature sufficient to bring about the start of melting and the welding of the ridge to the said portion of the roll surface.

9. A process according to claim 8, wherein said heating is implemented by means of a second laser beam or a deviated part of the intermittent laser beam.

10. A rolling mill roll with a surface having a multitude of microscopic dents formed by means of an intermittent laser beam, according to the process of claim 1, wherein the microscopic dents are provided with a ridge on only a part of their periphery.

11. A rolling mill roll according to claim 10, wherein the ratio L/D between the dimension L of the microscopic dents, measured along the periphery of the roll, and their dimension D, measured parallel to the longitudinal axis of the roll, has a value of between 1 and 5, preferably between 1.1 and 2.5.

12. A steel sheet cold-rolled by means of a roll according to claim 10, wherein the surface of the sheet has a multitude of uniformly distributed hollows, each hollow partially surrounding an elevation.

* * * * *